United States Patent [19]

Schilling

[11] Patent Number: 5,208,319
[45] Date of Patent: May 4, 1993

[54] ROSIN-BASED GRIND RESINS FOR AQUEOUS PRINTING INKS

[75] Inventor: Peter Schilling, Charleston, S.C.

[73] Assignee: Westvaco Corporation, New York, N.Y.

[21] Appl. No.: 904,218

[22] Filed: Jun. 25, 1992

Related U.S. Application Data

[63] Continuation-in-part of Ser. No. 712,436, Jun. 10, 1991, abandoned.

[51] Int. Cl.$^5$ .............................................. C09D 11/08
[52] U.S. Cl. ..................................... 530/210; 530/211; 530/212; 530/214; 530/230; 106/20 R; 106/30 R; 106/500
[58] Field of Search ............... 530/210, 211, 212, 214, 530/230; 106/20, 30, 500

[56] References Cited

U.S. PATENT DOCUMENTS

| | | | |
|---|---|---|---|
| 3,778,394 | 12/1973 | Lovald et al. | 530/214 |
| 4,219,382 | 8/1980 | Leffler | 530/214 |
| 5,066,331 | 11/1991 | Hutter | 106/30 |

FOREIGN PATENT DOCUMENTS 0072445 of 0000 Japan.

*Primary Examiner*—John Kight, III
*Assistant Examiner*—Richard Jones
*Attorney, Agent, or Firm*—Daniel B. Reece, IV; Terry B. McDaniel; Richard L. Schmalz

[57] ABSTRACT

The invention is ink pigment grinding resins for water-based printing inks which are produced by the amidation of maleated or fumarated rosin with a polyamine containing a primary amine group to produce the water soluble polyaminoamidoimide resin. The resulting rosin resin may be employed over a wide range of pH values to produce stable low or high viscosity grind bases.

20 Claims, No Drawings

ROSIN-BASED GRIND RESINS FOR AQUEOUS PRINTING INKS

This application is a continuation-in-part of my commonly assigned co-pending U.S. Pat. application Ser. No. 07/712,436 filed Jun. 10, 1991, entitled "Rosin-Based Grind Resins For Aqueous Printing Inks now abandoned."

FIELD OF INVENTION

The invention relates to compositions of matter for ink pigment grinding resins and the process for preparing them. In particular, the invention relates to grinding resins which produce high solids pigment dispersions for stable water-based ink formulations.

BACKGROUND OF THE INVENTION

Impelled by environmental concerns and increasing governmental regulations on the volatile organic content of inks and coatings, the applications of water-based flexographic and rotogravure inks are increasing in the ink industry. A typical water-based ink system is formulated by the addition of a binder resin (usually acrylic polymer lattices) to a grind base. Grind bases are prepared by using grinding resins to disperse pigments. Pigments are crystalline solids composed of agglomerates, aggregates, and primary particles which vary in size from 0.02 to 0.5 microns. During the grinding process, agglomerates and aggregates are broken down into primary particles which possess strong tendencies to reassociate in an ink. The finer the particle size of the pigment, the greater the color strength, but the more difficult the pigment becomes to disperse. Grinding resins help prevent the particles from reassociating by increasing both the electrostatic and steric repulsion between pigment particles.

An ink formulator must consider the compatibility of the various ink components when selecting the grind resins to be used. Grind bases (i.e., pigment dispersions) are let down with a variety of alkali-soluble resins or alkali-insoluble resin emulsions to achieve the properties desired for the end use of the ink. If the grind resins and the let-down resins are not compatible, the result may be pigment flocculation, viscosity increase, loss of color strength, and other problems.

Currently, the rosin resin FILTREZ® 5014 (manufactured by Akzo Chemicals, Inc.) is preferred in the alkali-soluble grind resin market. This resin has the ability to produce stable low viscosity grind bases and inks for water-based flexographic printing. FILTREZ 5014 also yields excellent color development when grinding pigments and contributes to the toughness and water resistance of finished inks. However, both the viscosity and the stability of grind bases and inks produced with the aid of commercially available polyester resins are highly dependent on the pigment-to-resin ratio, pigment loading, and pH-value. As grind bases must remain stable and fluid to be applicable, this pH dependence has remained a problem associated with the use of these resins.

In commonly assigned U.S. Pat. No. 5,066,331, Dr. G. Frederick Hutter describes the production of water-soluble resins having superior adhesive properties for use in formulating packaging inks. These resins are produced by reacting fumarated or maleated rosin with a compound containing two secondary amine groups and no primary amine groups. As Dr. Hutter states in the patent (Col. 2, lines 59–66), it is essential to his invention that primary amine groups not be utilized in the reaction with the modified rosin. While these resins make excellent binder resins for water based packaging inks, the resins are less successful when employed as grinding resins. Indeed, when one attempts to employ these resins as grinding resins, the resulting pigment dispersions are thixotrophic and extremely difficult to handle and utilize.

At the present time, the majority of water-based printing inks are produced at pH values between 8.5 and 10.5. It would be advantageous to ink formulators to have a resin which is stable over this entire range. Therefore, it is the object of this invention to have an alkali-soluble resin which may be used to prepare stable, low viscosity pigment dispersions over a wide range of pH values while maintaining excellent physical properties in the finished inks.

SUMMARY OF THE INVENTION

The object of this invention is met by reacting rosin with maleic acid, maleic anhydride, itaconic acid, itaconic anhydride, or fumaric acid to produce a fortified rosin containing polycarboxylic acids (e.g., tricarboxylic acids) or polycarboxylic acid anhydrides. The fumarized (or maleinized) rosin is reacted with a polyamine containing at least one primary amine group to produce the water soluble polyimido-, polyamido-, or polyaminoamidoimide grinding resins. Since grinding resins disperse pigment and influence ink rheology, they are major components in most aqueous ink formulations. Efficient dispersion of the pigment (which is the most expensive component of ink) produces maximum color strength and prevents settling and flocculation. This in turn influences grinding efficiency, transfer, and printability.

The ratio of rosin to maleic acid, maleic anhydride, itaconic acid, itaconic anhydride, or fumaric acid required to produce the desired polycarboxylic acid or anhydride ranges from 100:15 to 100:25. The ratio of polycarboxylic acid or anhydride to polyamine required to produce the desired grinding resin ranges from 100:10 to 100:15.

It has been found that the condensation reaction products of polyamines with certain rosin-based polycarboxylic acids or anhydrides are extremely efficient grinding aids. Grinding aids were prepared which gave good pigment dispersions at pigment-to-dispersant ratios of 5:1–15:1, and at pigment concentrations of 30–45%.

As mentioned, the invention is directed to ink pigment grinding resins and the process for preparing them. In addition, the invention is also directed to ink vehicles and inks containing such resins.

DESCRIPTION OF THE PREFERRED EMBODIMENT

Rosin is mainly a mixture of $C_{20}$, fused-ring, monocarboxylic acids, typified by levopimaric and abietic acids, both of which are susceptible to numerous chemical transformations. It is generally known in the art that $\alpha, \beta$-unsaturated acids and their anhydrides, such as maleic acid, maleic anhydride, itaconic acid, itaconic anhydride, and fumaric acid may be reacted with abietic type rosin acids to yield $C_{24}$ polycyclic tricarboxylic acids and anhydrides.

The invention resin is produced by reacting rosin with maleic acid, maleic anhydride, itaconic acid, itaconic anhydride, or fumaric acid to produce a rosin-based polycarboxylic acid or anhydride. The rosin polycarboxylic acid or anhydride is reacted with a polyamine containing at least one primary amine group to produce the alkali soluble polyamine-crosslinked grinding resin.

The polycarboxylic acids and anhydrides used in the preparation of the invention grinding aids are represented by the following formulae:

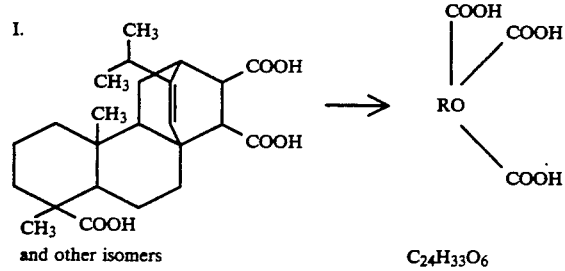

and other isomers $C_{24}H_{33}O_6$

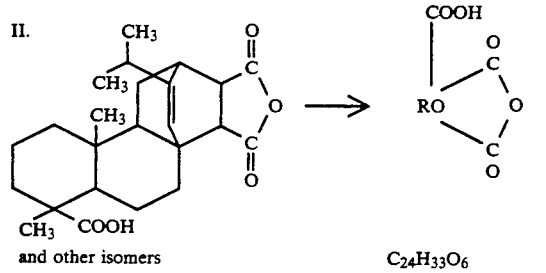

and other isomers $C_{24}H_{33}O_6$

When the polycarboxylic acids (I) or anhydrides (II) are heated with a polyamine, a variety of condensation products (i.e., amidoamides and imidoamides) can be obtained. As a general example, the reaction products of fumarized or maleinized rosin with two preferred polyamines (aminoethylpiperazine and triethylene tetramine) are described. Aminoethylpiperazine (or AEP, shown in FIG. 1 below), contains one primary (N'), one secondary (N''), and one tertiary (N''') amine group, each of which show differences in reactivity with carboxylic acid groups when forming amides. The primary amine group is more reactive than the secondary, while the tertiary nitrogen has little or no reactivity.

FIG. 1
Aminoethylpiperazine

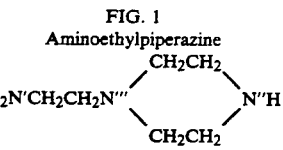

Fumarized (or maleinized) rosin contain carboxylic groups which also show differences in reactivity. The carboxylic groups (or anhydride structures) incorporated via the Diels-Alder reaction with fumaric acid or maleic anhydride form amide- or imide- structures at lower temperatures than the original carboxyl groups of the rosin. Thus, reaction of one mole tricarboxylic acid with one mole aminoethylpiperazine will result in an aminoimido carboxylic acid (FIG. 2) at low temperature (150°–160° C.).

FIG. 2

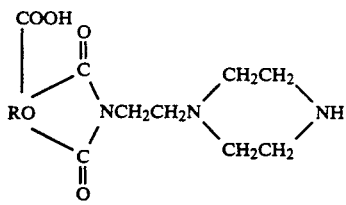

The resulting products resemble $C_{30}N_3$-diamino imido carboxylic acids (with a carbon to nitrogen ratio of 10:1).

Reaction of one mole dicarboxylic acid with 0.5 mole aminoethylpiperazine at 240°–250° C. will result in tricarboxylic acids (FIG. 3).

FIG. 3
With Aminoethylpiperazine (only one isomer shown)

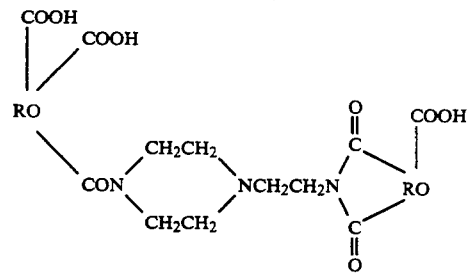

Here, the resulting products resemble $C_{54}N_3$-amino amido imido tricarboxylic acids (with a carbon to nitrogen ratio of 19:1).

FIGURE 4

Triethylene Tetramine (or TETA)

The commercial blend consists of 4 isomers with nitrogens of various reactivities.

  (~70%)

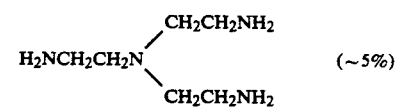  (~5%)

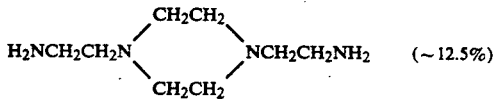  (~12.5%)

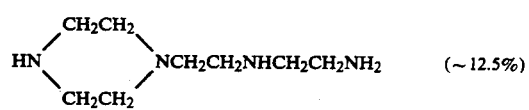  (~12.5%)

FIGURE 5

With Triethylene tetramine (only one isomer prepared with linear TETA shown).

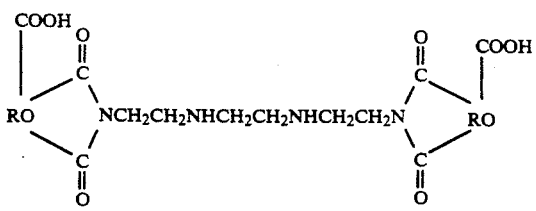

The resulting products resemble C54N4-di-amino di-imido dicarboxylic acids (with a carbon to nitrogen ratio of 13.5:1). Preferential reaction of the primary amine groups of the linear isomer with the anhydride functionalities of maleated rosin yields a alkali soluble polyamine-crosslinked dicarboxylic acid when reacted for 1-3 hours at a temperature range of 240°-260° C. The formaldehyde and the rosin is conducted at a temperature in the range of about 120°-160° C., with the preferred range being about 130°-150° C. The cycloaddition reaction is conducted at a temperature in the range of about 170°-230° C., with the preferred range being about 190°-210° C. The condensation reaction is conducted at a temperature in the range of about 220°-280° C. ,with the preferred range being about 230°-60° C. It is well within the expertise of a skilled artisan to vary the temperatures of and the reaction times of different reactions in order to produce the desired product.

The above reaction products constitute poly-rosin amino amido imido carboxylic acids. Fumarized (or maleinized) rosin contains carboxylic groups which also show differences in reactivity. The reaction products formed are due to the difference in reactivity of the various types of amine groups and carboxyl groups.

The ratio of tertiary amine groups to unreacted carboxylic groups can be varied as needed. One method is to decrease the number of both carboxyl groups and amine groups by blending increasing amounts of bis-primary-diamines (i.e., $H_2N(CH_2)_xNH_2$, etc.) to AEP (decreasing the carboxyl groups and amino groups). Another method is to decrease the number of amine groups while increasing the carboxyl groups by adding bis-secondary-diamines (i.e., $CH_3NH(CH_2)_xNHCH_3$, etc.) to AEP to achieve the desired piperazines.

Rosins which are suitable for use in the reaction include, but are not limited to, the following:
tall oil rosin,
wood rosin, and
gum rosin.

Reactants which are suitable for use in the Diels-Alder or the "ene"-cyclocondensation reaction with the above resin acids containing rosins include, but are not limited to, the following:
acrylic acid,
methacrylic acid,
fumaric acid, and
maleic anhydride.

Polyamines which are suitable for use in the reaction must have at least one primary amine group and include, but are not limited to, the following:
ethylene diamine,
diethylene triamine,
triethylene tetramine,
tetraethylene pentamine,
pentaethylene hexamine (and higher homologous),
N-aminoethyl propane diamine,
N-aminoethyl substituted butane diamines,
pentane diamines,
hexane diamines,
N-hydroxy ethyl ethylene diamine,
1,3-diaminopropane,
1,4-diaminobutane,
1,5-diaminopentane,
1,6-diaminohexane,
N-aminoethylpiperazine,
N-hydroxyethyl piperazine,
N-aminopropyl-propane diamine-1,3,
N-methyl-N-aminopropylpropane diamine-1,3,
N-aminohexylhexane diamine-1,6,
aminoethylethanolamine,
bis-aminopropylamine,
pentamethylenediamine, and
AMINE HH.

AMINE HH ® (a polyamine blend manufactured by Union Carbide, Inc.) is composed of the following major ingredients:

| | |
|---|---|
| aminoethylpiperazine: | 55.1-63.0% |
| triethylenetetramine: | 25.8-35.8% |
| aminoethylethanolamine: | 5.6-9.3% |
| diethylenetriamine: | 6.9-5.1% |
| hydroxyethylpiperazine: | 1.3-3.1% |

The grind bases and inks produced from the invention grinding aid are suitable for use within the pH range of 8.5 to 10.5.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A grinding aid for pigments used in water-based printing inks was produced via the following procedure. All reactants are measured in parts by weight.

One hundred (100) parts of ROSIN SS ® (a tall oil based rosin manufactured by Westvaco, Inc. was heated to 210° C. under a positive nitrogen pressure. Fifteen (15) parts of fumaric acid was added in a single portion to the hot resin. The mixture was stirred at 210° C. for 2 hours. Over a period of 30 minutes 8.6 parts of aminoethylpiperazine (AEP) was slowly added to the adduct, and heated to 240° C. (until all water of condensation was removed). The product was allowed to cool and the resin collected. For final pH adjustment of the aqueous varnishes, the desired amount of $NH_3$ or an amine was used. Finally, 0.1-1 part of FOAMBLAST 327 ® (a defoamer manufactured by Ross Chemicals, Inc.) was added.

EXAMPLE 2

A series of grinding resins was produced (via the method taught in Example 1) by reacting ROSIN SS with increasing amounts of fumaric acid or maleic anhydride (from 15-25%) and 0.25-0.50 mole equivalents of aminoethylpiperazine (AEP) or triethylenetetramine (TETA) based on fumaric acid or maleic anhydride to achieve 50% or 100% crosslinking of the fortified rosin molecules. The compositions of the various resins are listed in Table I below.

Two types of water based varnishes were prepared at a pH range of 9.0–9.5 from each respective resin. Formula A is representative of varnishes made for flexographic publication inks (at 30% NV or non-volatile), while Formula B is representative of varnishes made for flexographic packaging inks (at 35% NV).

| Formula A | Formula B |
|---|---|
| 30.0 g resin | 35.0 g resin |
| 65.0 g water | 51.8 g water |
| 0.2 g FOAMBURST 338 | 7.0 g isopropanol |
| 4.8 g monoethanol amine | 0.2 g FOAMBURST 338 |
|  | 6.0 g NH$_4$OH |

(FOAMBLAST 338 ®) is a defoamer manufacturered by Ross Chemicals, Inc. As necessary, the pH was adjusted to 9.0–9.5 with more amine. The results are listed in Table I below.

TABLE I
APPEARANCE OF VARNISHES

| Resin No. | Composition[d] | Varnish Prepared w/Water/ Ethanolamine (30% NV) | Varnish Prepared w/Water/ iPA/NH$_3$ (35% NV) |
|---|---|---|---|
| 1 | 15 FuAc, 8.6 AEP | Clear | Clear |
| 2 | 20 MA, 6.5 AEP | Precipitate | Clear |
| 3 | 20 MA, 13.0 AEP | Hazy | Clear |
| 4 | 25 MA, 8.1 AEP | Precipitate | Precipitate |
| 5 | 25 MA, 16.2 AEP | Clear | Clear |
| 6 | 15 FuAc, 10 TETA | Clear | Clear |
| 7 | 15 FuAc, 12 TETA | Clear | Clear |
| 8 | 15 FuAc, 14 TETA | Clear | Clear |
| 9 | 20 MA, 7.3 TETA | Clear | Clear |
| 10 | 20 MA, 14.6 TETA | Clear | Clear |
| 11 | 25 MA, 9.1 TETA | Clear | Clear |
| 12 | 15 FuAc, 4.7 TETA, 4.2 AEP[a] | Heavy Precipitate | Clear |
| 13 | 15 FuAc, 4.2 AEP, 4.7 TETA[b] | Clear | Clear |
| 14 | 15 FuAc, 4.7 TETA, 4.2 AEP[c] | Clear | Clear |

[a]TETA and AEP were blended and added to fumarized rosin.
[b]AEP was added first.
[c]TETA was added first.
[d]Listed in parts by component. Each composition also contained 100 parts of ROSIN SS.
FuAc: Fumaric acid.
MA: Maleic anhydride.
TETA: Triethylene tetramine.
AEP: Aminoethylpiperazine.

Table I shows the properties of the varnishes after one month's storage at ambient temperature. Overall, the TETA based resins were more stable than the AEP-crosslinked resins (i.e., all the TETA varnishes remained clear).

In preparing the resins, it was found that fortification of rosin with 20% maleic anhydride is the maximum preferred level when full crosslinking is desired. If rosin is fortified with 25% maleic anhydride, only 50% crosslinking is possible without producing a high-viscosity aqueous varnish. A higher TETA-charge will produce a resin with a very high melting point and low solubility (low acid number) which may prove difficult to process. Triethylene tetramine forms resins with higher molecular weights (when compared with AEP) due to its higher number of primary and secondary amine groups.

Grind bases containing 25% and 40% phthalocyanine blue pigment presscake (manufactured by Sun Chemical, Inc. under the designation 449-550) were prepared (using the corresponding varnishes listed on page 12) at various resin contents to measure the effect of resin content on viscosity. The grind bases were formulated as follows:

| Grind Base A (25%) | Grind Base B (40%) |
|---|---|
| 13.3–35.0 parts Varnish A | 11.4–30.0 parts Varnish B |
| 50.0 parts presscake (50% solids) | 50.0 parts presscake (50% solids) |
| 0.5 parts SURFYNOL DF-75 | 0.5 parts SURFYNOL DF-75 |
| Water to 100 parts | Water to 100 parts |

(SURFYNOL DF-75 ®) is a defoamer manufactured by Air products, Inc.) The storage stabilities of the 40% grind bases over a period of one month were evaluated against some standard industry resins (see Table II).

Inks were prepared from grind bases containing 25% pigment as follows:

| | |
|---|---|
| 30.0 g grind base | |
| 19.2 g JONCRYL 87 | |
| 5.8 g water | |
| 1.8 g i-propanol | |
| 3.0 g JONWAX 26 | |
| 0.2 g SURFYNOL 104E | |

(JONCRYL 87 ®) is an acrylic resin and JONWAX 26 ®) is a micro wax manufactured by S. C. Johnson and Sons, Inc.) (SURFYNOL 104E ®) is a defoamer manufactured by Air Products, Inc.) Inks were stored for at least one month to determine storage stability via viscosity measurements. The results of the screening experiments are compiled in Table II.

TABLE II
EVALUATION OF GRIND BASES AND INKS

| Resin No.[a] | % Pigment | % Resin | Viscosity[b] Grind Base | | Viscosity Ink[c] | |
|---|---|---|---|---|---|---|
| 1 | 25 | 17.32 | | | Z-2/108.3[1] | Z-4/56.6[22] |
| | 25 | 8.75 | | | Z-2/19.6[1] | Z-2/48.8[80] |
| | 40 | 4.00 | 19.4[1] | 43.2[38] | | |
| 2 | 25 | 17.32 | | | Z-4/39.4[1] | Z-4/85.5[66] |
| | 25 | 8.75 | | | Z-2/66.7[1] | Z-2/82.0[66] |
| | 40 | 4.00 | 38.1[1] | 50.5[50] | | |
| 3 | 25 | 17.32 | | | Z-4/52.2[1] | Z-4/150+[66] |
| | 25 | 8.75 | | | Z-2/22.4[1] | Z-2/81.0[66] |
| | 40 | 4.00 | 14.2[1] | 15.1[50] | | |
| 4 | 25 | 17.32 | | | Z-4/35.6[1] | Z-4/120.2[66] |
| | 25 | 8.75 | | | Z-2/29.8[1] | Z-2/123.5[66] |
| | 40 | 4.00 | 14.6[1] | 30.0[50] | | |
| 5 | 25 | 17.32 | | | Z-4/47.6[1] | Z-4/151.0[66] |

TABLE II-continued
EVALUATION OF GRIND BASES AND INKS

| Resin No.[a] | % Pigment | % Resin | Viscosity[b] Grind Base | | Viscosity Ink[c] | |
|---|---|---|---|---|---|---|
| | 25 | 8.75 | | | Z-2/21.1[1] | Z-2/109.6[66] |
| | 40 | 4.00 | 14.6[1] | 14.5[50] | | |
| 6 | 25 | 17.32 | | | Z-4/18.4[1] | Z-4/28.7[11] |
| | 25 | 8.75 | | | Z-2/17.0[1] | Z-2/22.0[37] |
| | 40 | 4.00 | 16.1[1] | 16.6[38] | | |
| 7 | 25 | 17.32 | | | Z-2/65.6[1] | Z-4/22.1[45] |
| | 25 | 15.56 | | | Z-2/42.7[1] | Z-2/68.9[47] |
| | 25 | 8.75 | | | Z-2/19.2[1] | Z-2/27.8[37] |
| | 40 | 4.00 | 18.7[1] | 18.5[38] | | |
| 8 | 25 | 17.32 | | | Z-2/66.9[1] | Z-2/68.7[11] |
| | 25 | 8.75 | | | Z-2/36.4[1] | Z-2/38.9[37] |
| | 40 | 4.00 | 25.4[1] | 26.0[38] | | |
| 9 | 25 | 17.32 | | | — | |
| | 25 | 8.75 | | | Z-2/19.3[1] | Z-2/48.9[59] |
| | 40 | 4.00 | 18.4[1] | 37.1[47] | | |
| 10 | 25 | 17.32 | | | Z-2/30.7[1] | Z-2/25.4[10] |
| | 25 | 13.00 | | | Z-2/20.2[1] | Z-2/17.9[11] |
| | 25 | 8.75 | | | Z-2/17.4[1] | Z-2/19.9[59] |
| | 40 | 4.00 | 20.9[1] | 18.2[47] | | |
| 11 | 25 | 17.32 | | | Z-2/34.0[1] | Z-2/48.1[10] |
| | 25 | 8.75 | | | Z-2/17.1[1] | Z-2/17.0[10] |
| | 40 | 4.00 | 13.6[1] | 33.5[47] | | |
| 12 | 25 | 17.32 | | | Z-2/50.0[1] | — |
| | 25 | 8.75 | | | Z-2/25.6[1] | Z-2/65.0[58] |
| | 40 | 4.00 | 17.0[1] | 34.2[47] | | |
| 13 | 25 | 17.32 | | | Z-2/43.0[1] | — |
| | 25 | 8.75 | | | Z-2/20.1[1] | Z-2/32.2[59] |
| | 40 | 4.00 | 15.7[1] | 18.2[47] | | |
| 14 | 25 | 17.32 | | | Z-4/20.8[1] | — |
| | 25 | 8.75 | | | Z-2/18.5[1] | Z-2/21.8[58] |
| | 40 | 4.00 | 14.7[1] | 17.6[47] | | |
| FILTREZ 5014 | 25 | 17.32 | | | Z-2/21.5[1] | Z-2/20.4[34] |
| | 25 | 8.75 | | | Z-2/16.0[1] | Z-2/15.7[11] |
| | 40 | 4.00 | no flow | | | |
| JONCRYL 678[d] | 40 | 4.00 | 16.3[1] | 14.7[30] | | |
| SURFYNOL CT-136[e] | 40 | 4.00 | 41.2[7] | 27.3[30] | | |
| SURFYNOL GA[f] | 40 | 4.00 | 67.7[7] | 68.5[30] | | |

[a] For Resin composition see Table I.
[b] The Grind Base Viscosity was measured in seconds via a #3 Shell cup.
[c] The ink was let down with JONCRYL 87 and JONWAX 26;
Z-2: The Full Strength Ink Viscosity was measured in seconds via a #2 Zahn cup.
Z-4: The Full Strength Ink Viscosity was measured in seconds via a #4 Zahn cup.
The numerical superscripts represent the number of days at which the viscosity was measured.
[d] JONCRYL 678 ® is an acrylic resin manufactured by S. C. Johnson and Sons, Inc.
[e] SURFYNOL CT-136 ® is a grinding aid manufactured by Air Products, Inc.
[f] SURFYNOL GA ® is a grinding aid manufactured by Air Products, Inc.

FILTREZ 5014 gave the lowest viscosity grind bases at 25% pigment an high resin contents; grind bases prepared at 40% pigment and 4% resin were very viscous and did not flow. The invention rosin resin gave high viscosity grind bases at high resin contents and low viscosities at low resin contents. The grind bases produced via the taught method at 40% pigment loading had good color values, comparable or better than those prepared with the resins JONCRYL 678, SURFYNOL GA, or SURFYNOL CT-135 (which are commonly used for high pigment grinds).

Taking the viscosities of the full strength inks, the 40% pigment concentrates, and the color strength of the latter into account, resin number 13 (prepared by reacting 100 parts ROSIN SS with 20 parts maleic anhydride and 14.6 parts triethylene tetramine) is a more preferred embodiment.

EXAMPLE 3

As carbon black is the most widely used pigment in publication flexographic inks, a series of resins were produced via the method taught in Example 1 using VULCAN K ® (a carbon black manufactured by Cabot Chemicals, Inc.). Two sets of varnishes at 30% resin content were prepared: in the first set monoethanolamine was added to reach a pH range of 9.2-9.5, while the second set was prepared by dissolving 100 parts resin in the presence of 13.3 parts monoethanolamine (which resulted in high pH varnishes). Due to the low acid numbers and the partially amphoteric character of the resins, the varnishes had very high viscosities at the lower pH values. The higher amine content (pH 10.0-10.5) made the varnishes more fluid. News inks are generally prepared at a pH of approximately 10.0, thus the high pH values of the varnishes are acceptable. Also, the higher amount of monoethanolamine improves the rewetability of the inks.

The amino resins produced stable varnishes as long as the degree of maleinization is higher than 15% and the amount of amine applied for crosslinking is at least 12%. This is in contrast to many varnishes currently prepared from several commercial rosin-based polyester resins where gelation occurs on storage.

The grind bases with Vulcan K were prepared as follows (in parts by weight):

10 parts Varnish
30 parts VULCAN K
1 part FOAMBURST 338
59 parts Water

The viscosity of each was determined one day after grinding and again after at least 30 days storage. Grinds which did not change viscosities (as measured by a Shell #3 cup) by more than 5 seconds were considered stable. Due to the low resin content light settling of the pigment occurred in several cases, but the sediment could be redispersed with slight agitation.

The results are shown in Table III.

TABLE III
CARBON BLACK GRIND BASES

| Resin No. | Resin Composition[a)g)] | Viscosity (S-3 sec.)[b)] A | B |
|---|---|---|---|
| A | 20 MA, 13 AEP | $16.3^1/19.3^{32}$ | $20.6^1/25.3^{34}$ |
| B | 25 MA, 16.2 AEP | $16.9^1/11.1^{32}$ | $20.5^1/16.3^{34}$ |
| C | 17.5 MA, 9.6 TETA | $10.7^1/19.2^{30}$ | $19.0^1/20.2^{33}$ |
| D | 19 MA, 13.9 TETA | $12.9^1/11.2^{30}$ | $17.3^1/16.6^{33}$ |
| E | 20 MA, 11 TETA | $15.1^1/15.7^{30}$ | $17.2^1/19.0^{33}$ |
| F | 20 MA, 14.6 TETA (230° C.)[e)] | $15.1^1/13.1^{30}$ | $22.9^1/22.5^{33}$ |
| G | 22.5 MA, 12.3 TETA | $14.5^1/12.4^{30}$ | $19.5^1/17.5^{33}$ |
| H | 25 MA, 9.1 TETA | $10.4^1/11.1^{49}$ | $20.3^1/14.3^{34}$ |
| I | 20 MA, 18.3 TETA | $10.3^1/32.6^{30}$ | $15.0^1/13.6^{33}$ |
| J | 27.5 MA, 10 TETA | $34.6^1/33.3^{30}$ | $14.4^1/14.8^{33}$ |
| K | 20 MA, 12 TETA | $12.1^1/11.4^{27}$ | $17.5^1/18.6^{33}$ |
| L | 13.75 FuAc, 12.5 MA 13.7 TETA | $14.5^1/19.0^{30}$ | $17.2^1/19.0^{33}$ |
| | SURFYNOL GA[c)] | $17.7^3/21.6^{36}$ (20% dilution) | — — |
| | SURFYNOL CT-136[c)] | $12.7^3/13.4^{36}$ | — — |
| | JONCRYL 678[d)] | $15.6^3/12.9^{36}$ | — — |
| | FILTREZ 5014[f)] | $35.0^1$ (S-3)/ $38.4^{49}$ (Z-2) | — — |

[a)]FuAc: fumaric acid.
MA: maleic anhydride.
TETA: triethylene tetramine.
AEP: aminoethylpiperazine.
[b)]S-3: Shell cup #3; Z-2: Zahn cup #2.
A: Varnish adjusted with MEA to pH value 9.2-9.5.
B: Varnish prepared with 8 g MEA per 30 g resin.
Numerical superscripts indicate number of days of storage.
[c)]Air Products, Inc.
[d)]S. C. Johnson & Sons, Inc.
[e)]Temperature used for TETA condensation.
[f)]AKZO Chemicals.
[g)]100 parts ROSIN SS.

Both aminoethylpiperazine (AEP) and triethylenetetramine (TETA) performed well as crosslinking agents. The resins prepared with TETA showed good results independent of the amount of fumaric acid or maleic anhydride used. However, a minimum amount of 12% TETA was necessary to obtain stable, noncrystallizing varnishes when prepared with water and monoethanolamine. Typical grinding aids such as SURFYNOL GA and SURFYNOL CT-136, and acrylic grind resins such as JONCRYL 678 gave low viscosity concentrates with 30% pigment at 3% resin content. However, FILTREZ 5014, which is widely used in packaging inks at higher resin loadings, produced thixotropic grinds.

In order to evaluate the color and gloss of the carbon black concentrates, the grind bases were diluted to 20% pigment concentration and drawn-down on uncoated paper with a Meyer #2 rod. The tinctorial strength was determined with a MacBeth Color Eye against the black tile for reference. The results are listed in Table IV below. A lower number indicates a darker drawdown. Gloss was determined at the 60° angle.

The pH value of the grind bases prepared with the amino resins influences these values. Low pH value (7.8–8.6) grind bases gave low gloss draw-downs with high color values, whereas grind bases prepared at pH 8.7–9.5 gave higher gloss draw-downs with lower color values.

TABLE IV
COLOR AND GLOSS OF GRIND BASES

| Resin No.[a)] | Color Value[b)] | Gloss Value[c)] | pH Value[d)] A | B |
|---|---|---|---|---|
| A | 20.25 | 3.2 | — | 9.17 |
| B | 20.71 | 3.3 | 8.62 | — |
|   | 20.14 | 3.5 | 8.60 | — |
| C | 16.38 | 1.2 | 8.14 | — |
|   | 20.41 | 3.0 | — | 9.12 |
| D | 16.62 | 1.6 | 8.77 | — |
|   | 20.44 | 3.5 | — | 9.23 |
| E | 21.59 | 2.8 | 8.90 | — |
|   | 20.21 | 3.2 | — | 9.15 |
| F | 20.41 | 2.8 | 8.77 | — |
|   | 20.41 | 3.4 | — | 9.30 |
| G | 20.78 | 3.0 | 8.84 | — |
|   | 20.33 | 3.0 | — | 9.23 |
| H | 20.67 | 2.7 | 8.65 | — |
|   | 20.25 | 3.3 | — | 9.08 |
| I | 16.86 | 2.3 | 8.20 | — |
|   | 19.98 | 3.0 | — | 9.33 |
| J | 20.44 | 3.1 | — | 9.05 |
| K | 20.63 | 3.2 | 8.95 | — |
|   | 20.90 | 3.4 | — | 9.03 |
| L | 20.63 | 3.4 | 8.89 | — |
|   | 20.41 | 3.2 | — | 9.14 |

[a)]For composition, see Table III.
[b)]Against black tile as a reference: a lower number indicates a darker draw-down.
[c)]Measured at a 60° angle.
[d)]A: Varnish adjusted with MEA to pH 9.2-9.5.
B: Varnish prepared with 8 g MEA per 30 g resin to yield a pH of about 10.0.

Bleaches with a TiO$_2$ ink (FLEXOVERSE WHITE ® manufactured by Sun Chemicals, Inc. under the designation WFD-5006) were prepared at a weight ratio of 19:1 from a few grind bases which showed large differences in gloss and color strength at different pH values. Due to the excess of white ink, the gloss of the draw-downs is determined by the resin of the white ink. Differences in color values are due to "true" differences in color strength of the grind bases.

As Table V below shows, grind bases prepared at the lower pH values gave darker bleach draw-downs.

TABLE V
COLOR VALUES OF BLACKS BLEACHED AT 19:1

| Resin[a)] | Color Value[b)] A | B | (B-A) |
|---|---|---|---|
| D | 55.25 | 55.34 | 0.09 |
| E | 55.07 | 55.14 | 0.07 |
| J | 54.78 | 55.43 | 0.65 |

[a)]For composition, see Table III.
[b)]Determined against black tile as reference: a lower value indicates a darker draw-down.
A: Varnish adjusted with MEA to pH 9.2-9.5.
B: Varnish prepared with 8 g MEA per 30 g resin.

EXAMPLE 4

A preferred grinding resin for use in preparing water-based printing inks is produced via the following procedure, which is taught in parts by weight of reactants. ROSIN SS (100 parts) was heated to 210° C. in a 1000 ml three-neck round-bottom flask under a positive nitrogen flow. Maleic anhydride (24 parts) was added to the molten rosin and this mixture was stirred for three hours. A mixture of (7 parts) diethylene glycol and (7 parts) AMINE HH was added slowly and stirred at 240° C. (until all water of condensation was removed). Finally, the product was allowed to cool before collecting the resin.

EXAMPLE 5

A series of preferred pigment grinding resins for use in preparing water-based printing inks was produced via the method taught in Example 4. Subsequently, these resins were used to produce two groups of varnishes. In one (Varnish A), 35% NV varnishes were prepared with water/isopropanol mixtures using ammonia. In the other (Varnish B), 30% NV varnishes were prepared with water only using monoethanolamine (MEA) as a base. The formulations are listed below:

| Varnish A | Varnish B |
| --- | --- |
| 35.0 parts Resin | 30.0 parts Resin |
| 7.0 parts Isopropanol (iPA) | 6.0 parts MEA |
| 6.0 parts NH$_3$ | 0.5 parts SURFYNOL DF-75 |
| 0.5 parts SURFYNOL DF-75 | Water to 100 parts |
| Water to 100 parts | |

All-water varnishes are generally used for publication flexography.

These varnishes were used with phthalocyanine to produce grinding bases. The phthalocyanine was ground at 25% loading using 5.25% to 10.5% grind resin as follows:

| Grind Base A | Grind Base B |
| --- | --- |
| 11.4–30.0 parts Varnish A | 13.3–35.0 parts Varnish B |
| 50.0 parts presscake (50% solids) | 50.0 parts presscake (50% solids) |
| 0.5 parts SURFYNOL DF-75 | 0.5 parts SURFYNOL DF-75 |
| Water to 100 parts | Water to 100 parts |

The viscosity of the grind bases are evaluated in Table VI.

TABLE VI
VISCOSITY OF PHTHALOCYANINE BLUE 25% PIGMENT GRINDS

| Resin[a] | Viscosity[b] | | | |
| --- | --- | --- | --- | --- |
| | 5.25% | 7.0% | 8.75% | 10.5% |
| A-1 | $15.0^{13}$ | $17.0^{13}$ | $21.8^{13}$ | $35.9^{13}$ |
| | $15.6^{42}$ | $16.4^{42}$ | $19.7^{42}$ | $38.6^{42}$ |
| A-2 | $15.0^{13}$ | $16.3^{8}$ | $19.8^{8}$ | $30.1^{8c)}$ |
| | $13.7^{36}$ | $16.8^{36}$ | $19.7^{36}$ | $32.2^{36}$ |
| B-1 | $15.0^{4}$ | $16.2^{4}$ | $19.6^{4}$ | $15.7^{4c)}$ |
| | $15.0^{34}$ | $15.7^{34}$ | $18.3^{34}$ | $28.2^{34}$ |
| B-2 | $14.8^{4}$ | $15.9^{2}$ | $19.0^{2}$ | $29.6^{2}$ |
| | $14.8^{34}$ | $16.3^{32}$ | $19.2^{32}$ | $35.0^{32}$ |
| C-1 | $15.2^{1}$ | $17.6^{1}$ | $21.2^{2}$ | $27.9^{2c)}$ |
| | $15.3^{34}$ | $17.1^{34}$ | $18.7^{32}$ | $22.4^{32}$ |
| C-2 | $14.7^{1}$ | $15.3^{1}$ | $33.6^{1}$ | $58.4^{1c)}$ |
| | $16.1^{34}$ | $48.5^{34}$ | $9.4^{34}$ | $11.5^{34}$ |
| D-1 | $15.4^{1}$ | $16.5^{1}$ | $23.8^{1}$ | $28.6^{1}$ |
| | $14.5^{44}$ | $17.2^{44}$ | $18.6^{44}$ | $25.9^{44}$ |
| D-2 | $15.4^{1}$ | $15.6^{1}$ | $18.7^{1}$ | $26.0^{1}$ |
| | $14.7^{44}$ | $15.5^{44}$ | $18.6^{44}$ | $31.4^{44}$ |

[a]A-1: 100 parts ROSIN SS reacted with 23.75 parts maleic anhydride and 14.5 parts triethylene tetramine (MEA), 0.5% FOAMBURST 338 (a defoamer manufactured by Ross Chemicals, Inc.).
A-2: 100 parts ROSIN SS reacted with 23.75 parts maleic anhydride and 14.5 parts triethylene tetramine (NH$_3$, iPA), 0.5% SURFYNOL DF-75 (a defoamer manufactured by Air Products, Inc.).
B-1: 100 parts ROSIN SS reacted with 23.75 parts maleic anhydride and 14.5 parts AMINE HH (MEA), 0.5% SURFYNOL DF-75.
B-2: 100 parts ROSIN SS reacted with 23.75 parts maleic anhydride and 14.75 parts AMINE HH (NH$_3$, iPA), 0.5% FOAMBURST 338.
C-1: 100 parts ROSIN SS reacted with 23.75 parts maleic anhydride and 14.5 parts aminoethylpiperazine (MEA), 0.5% SURFYNOL DF-75.
C-2: 100 parts ROSIN SS reacted with 23.75 parts maleic anhydride and 14.5 parts aminoethylpiperazine (NH$_3$, iPA), 0.5% FOAMBURST 338.
D-1: JONCRYL-678 (MEA).
D-2: JONCRYL-678 (NH$_3$, iPA).
[b]Viscosity measured via a Zahn cup #2 in seconds. Superscript indicates days in storage.
[c]Viscosity measured via a Zahn cup #3 in seconds.

Table VI shows the viscosity of the grind bases. The A resins (the resins prepared with TETA) and the B resins (the resins prepared with AMINE HH) gave storage-stable grinds up to 10.5% resin in both all-water and water/i-propanol systems. The C resins (the resins prepared with aminoethylpiperazine) gave storage-stable grinds in the all-water system but unstable gelling grinds in the water/i-propanol system. A major factor for this behavior is the higher acid number of the C resins (AN 121.8). Since the same amounts of NH$_3$ or monoethanolamine were used for each varnish, the pH values of the grind bases containing 8.7% resins were 9.41, 9.0, 8.42 (NH$_3$) and 10.44, 10.36, 10.26 (MEA), respectively. A pH value of 8.4 for the C resins' varnish appears to be too low. The D resins (the resins prepared with JONCRYL-678 gave stable grinds at lower viscosity. Table VII evaluates color strength and gloss of the 25% pigment grinds prepared with 8.75% resin.

TABLE VII
COLOR STRENGTH AND GLOSS AT 25% PIGMENT GRINDS

| Resin[a] | Amine | 60° Gloss | Diluted 1:1 with Water[b] | | | Bleached[c] | | | pH Values |
| --- | --- | --- | --- | --- | --- | --- | --- | --- | --- |
| | | | DL | Da | Db | DL | Da | Db | |
| A-2 | NH$_3$,iPA | 1.5 | 26.82 | 8.63 | −37.47 | −32.43 | −12.88 | −31.07 | 9.41 |
| B-2 | NH$_3$,iPA | 2.2 | 27.07 | 9.04 | −37.69 | −31.58 | −12.82 | −32.66 | 9.00 |
| C-2 | NH$_3$,iPA | 1.0 | 27.12 | 7.32 | −43.49 | −29.58 | −12.75 | −31.76 | 8.42 |
| D-2 | NH$_3$,iPA | 2.9 | 32.18 | 11.03 | −35.84 | −31.91 | −12.53 | −33.18 | 8.86 |
| A-1 | MEA | 2.3 | 29.22 | 12.81 | −32.37 | −32.22 | −12.29 | −33.29 | 10.44 |
| | MEA | 2.1 | 29.62 | 7.89 | −38.29 | −31.32 | −12.90 | −32.86 | 8.82 |
| B-1 | MEA | 2.7 | 29.74 | 11.27 | −32.29 | −31.60 | −12.44 | −34.07 | 10.36 |
| | MEA | 2.2 | 29.84 | 8.14 | −37.54 | −30.71 | −12.74 | −33.10 | 8.60 |
| C-1 | MEA | 1.5 | 34.67 | 6.01 | −32.34 | −30.79 | −12.51 | −33.46 | 10.26 |
| | MEA | 1.3 | 35.17 | 3.80 | −34.59 | −31.12 | −12.85 | −31.69 | 8.92 |

TABLE VII-continued

COLOR STRENGTH AND GLOSS AT 25% PIGMENT GRINDS

| Resin[a] | Amine | 60° Gloss | Diluted 1:1 with Water[b] | | | Bleached[c] | | | pH Values |
|---|---|---|---|---|---|---|---|---|---|
| | | | DL | Da | Db | DL | Da | Db | |
| D-1 | MEA | 2.8 | 30.58 | 13.23 | −35.00 | −31.29 | −12.30 | −33.87 | 8.68 |

[a] For resin composition see Table VI.
[b] Determined against black tile.
DL: a lower number indicates darker draw-down.
Da: a higher number indicates redder draw-down.
Db: a higher negative number indicates a bluer draw-down.
[c] Determined against white tile as reference.
DL: a higher negative number indicates darker draw-down.
Da: a higher negative number indicates greener draw-down.
Db: a higher negative number indicates bluer draw-down.

At 8.75% resin content (as shown above in Table VII), the grind base prepared with the A resins had the best color strength in both the all-water and water/i-propanol system. The pH value did not influence the color development. The A and B resins (also the C-2 resin) in water/i-propanol showed better grinding efficiency (faster) than the D resins (JONCRYL-678), the hard acrylic grind resins widely used for water-based inks.

EXAMPLE 6

A preferred grinding aid for pigments used in water-based printing inks was produced via the following procedure. All reactants are measured in parts by weight.

One hundred (100) parts of ROSIN SS ® was heated to C under positive nitrogen pressure. One (1) part of paraformaldehyde was added to the rosin, and the resulting mixture was heated to 150° C. and maintained at that temperature for one hour. Fifteen (15) parts of maleic anhydride was added to the adduct, which was subsequently heated to 200° C. and maintained at that temperature, with stirring, for two hours. Over a period of minutes 9.8 parts of aminoethylpiperazine (AEP) was slowly added to the adduct. The adduct was heated to 240° C. and maintained at that temperature for two hours (or until all water of condensation was removed). The product was allowed to cool and the resin collected. A high pH varnish was prepared by dissolving 100 parts of the resin in 13.3 parts of monoethanolamine. This varnish was used to produce a grind by mixing 10 parts of the varnish with 30 parts of VULKAN K, 1 part of FOAMBURST 338, and 59 parts water.

Using a #3 Shell Cup, the viscosity was measured at 21.9 seconds one day after grinding and at 23.5 seconds 34 days after grinding. This is considered to be a stable grind.

EXAMPLE 7

A series of preferred grinding resins was produced via the method taught in Example 6 above. In each resin 100 parts of ROSIN SS was first reacted with 1 part of para-formaldehyde. The resulting adduct was in turn reacted with various amounts of maleic anhydride and aminoethylpiperazine to produce the grinding resins. The specific formulations are listed in Table VIII High pH varnishes were prepared by dissolving 100 parts of each resin in 13.3 parts of monoethanolamine. These varnishes were used to produce grinds by mixing 10 parts of each respective varnish with 30 parts of VULKAN K, 1 part of FOAMBURST 338, and 59 parts water. The viscosities were determined one day after grinding and after at least 30 days storage, and the results listed in Table VIII below. Grinds which did not change S-3 viscosities (Shell Cup #3) by more than 5 seconds are considered stable.

TABLE VIII

| Resin Composition[a] | Viscosity[b] |
|---|---|
| 100 RoSS-1FA-20 MA-13 AEP | $15.8^1/14.1^{34}$ |
| 100 RoSS-1FA-25 MA-17 AEP | $15.8^1/13.8^{34}$ |
| 100 RoSS-1FA-30 MA-20 AEP | $12.7^1/11.0^{34}$ |

[a] RoSS: ROSIN SS
FA: Formaldehyde
MA: maleic anhydride
AEP: aminoethylpiperazine
[b] Measured via a #3 Shell cup. Superscript indicates days of storage.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A water soluble grinding resin comprising the reaction product of:
   (a) 100 parts by weight of rosin reacted in a cycloaddition reaction with 5 to 30 parts by weight of a member selected from the group consisting of maleic acid, maleic anhydride, itaconic acid, itaconic anhydride, and fumaric acid to produce a rosin adduct; and
   (b) 100 parts by weight of said rosin adduct reacted in a condensation reaction with 5 to 25 parts by weight of a polyamine containing at least one primary amine group to produce said reaction product.

2. The grinding resin of claim 1 comprising the reaction product of:
   (a) 100 parts by weight of resin reacted in a cycloaddition reaction with 15 to 25 parts by weight of a member selected from the group consisting of maleic acid, maleic anhydride, itaconic acid, itaconic anhydride, and fumaric acid to produce a rosin adduct; and
   (b) 100 parts by weight of said rosin adduct reacted in a condensation reaction with 10 to 20 parts by weight of a polyamine containing at least ne primary amine group to produce said reaction product.

3. The grinding resin of claim 1 which further comprises reacting from 0.5 to 5.0 parts by weight of formaldehyde with the rosin prior to the cycloaddition reaction.

4. The grinding resin of claim 1 which further comprises substituting from 1014 90% of the polyamine with a member selected from the group consisting of ethylene glycol, diethylene glycol, and polyethylene glycol.

5. The grinding resin of claim 1 wherein the rosin is a member selected from the group consisting of tall oil rosin, wood rosin, gum rosin, and combinations thereof.

6. The grinding resin of claim 1 wherein the polyamine is a member selected from the group consisting of ethylene diamine, diethylene triamine, triethylene tetramine, tetraethylene pentamine, pentaethylene hexamine, N-aminoethyl propane diamine, N-aminoethyl substituted butane diamines, pentane diamines, hexane diamines, N-hydroxy ethyl ethylene diamine, 1,3-diaminopropane, 1,4-diaminobutane 1,5-diaminopentane, 1,6-diaminohexane, N-aminoethylpiperazine, N-hydroxyethyl piperazine, N-aminopropyl-propane diamine-1,3, N-methyl-N-aminopropylpropane diamine-1,3, N-aminohexylhexane diamine-1,6, aminoethylethanolamine, diethylenetriamine, bis-aminopropylamine, pentamethylenediamine, and combinations thereof.

7. A grind base comprising the grinding resin of claim 1 dispersed with ink pigments.

8. A grind base comprising the grinding resin of claim 2 disperse with ink pigments.

9. A grind base comprising the grinding resin of claim 3 dispersed with ink pigments.

10. A grind base comprising the grinding resin of claim 4 dispersed with ink pigments.

11. A water-based ink comprising the grind base of claim 7 let down in a binder resin emulsion.

12. A water-based ink comprising the grind base of claim 8 let down in a binder resin emulsion.

13. A water-based ink comprising the grind base of claim 9 let down in a binder resin emulsion.

14. A water-based ink comprising the grind base of claim 10 let down in a binder resin emulsion.

15. The grinding resin of claim 1 wherein the cycloaddition reaction is conducted at a temperature in the range of 170°–230° C.

16. The grinding resin of claim 1 wherein the cycloaddition reaction is conducted at a temperature in the range of 190°–210° C.

17. The grinding resin of claim 1 wherein the condensation is conducted at a temperature in the range of 220°–280° C.

18. The grinding resin of claim 1 wherein the condensation reaction is conducted at a temperature in the range of 230°–260° C.

19. The grinding resin of claim 3 wherein the reaction between the formaldehyde and the rosin is conducted at a temperature in the range of 120°–160° C.

20. The grinding resin of claim 3 wherein the reaction between the formaldehyde and the rosin is conducted at a temperature in the range of 130°–150° C.

* * * * *

UNITED STATES PATENT AND TRADEMARK OFFICE
CERTIFICATE OF CORRECTION

PATENT NO. : 5,208,319
DATED : May 4, 1993
INVENTOR(S) : Peter Schilling

It is certified that error appears in the above-indentified patent and that said Letters Patent is hereby corrected as shown below:

In column 1, line 8, after Inks, insert --"--.

In column 1, line 9, after abandoned, delete " " ".

In column 4, line 37, delete "19:1" and substitute therefor --18:1--.

In column 5, line 18, before formaldehyde, insert --reaction between the--.

In column 5, line 26, delete "60°C" and substitute therefor --260°C--.

In column 6, line 47, after Inc., insert --)--.

In column 7, line 16, delete "manufacturered" and substitute therefor --manufactured--.

In column 7, line 17, after Inc., insert --)--.

In column 9, line 44, delete "an" and substitute therefor --and--.

UNITED STATES PATENT AND TRADEMARK OFFICE
CERTIFICATE OF CORRECTION

PATENT NO. : 5,208,319
DATED : May 4, 1993
INVENTOR(S) : Peter Schilling

It is certified that error appears in the above-indentified patent and that said Letters Patent is hereby corrected as shown below:

In column 15, line 31, before C, insert --130°--.

In column 15, line 38, before minutes, insert --30--.

In column 15, line 60, after VIII, insert --below--.

In Claim 2, column 16, line 51, delete "resin" and substitute therefor --rosin--.

In Claim 2, column 16, line 59, delete "ne" and substitute therefore --one--.

In Claim 4, column 16, line 67, delete "1014" and substitute therefor -- 10- --.

In Claim 8, column 17, line 27, delete "disperse" and substitute therefor --dispersed--.

In column 5, line 13, "Preferential" should begin a new paragraph.

Signed and Sealed this

Eighth Day of March, 1994

Attest:

BRUCE LEHMAN

*Attesting Officer*    *Commissioner of Patents and Trademarks*